(12) United States Patent  
Kornherr et al.

(10) Patent No.: US 8,615,984 B2  
(45) Date of Patent: Dec. 31, 2013

(54) DEVICE FOR THE DISTRIBUTION OF FLOWABLE ADDITIVES IN EXHAUST GAS SYSTEMS

(75) Inventors: Heinz Kornherr, Sindelfingen (DE); Michael Mueller, Nagold (DE); Klaus Schoenberger, Niederneukirchen (AT); Bernhard Aichhorn, Linz (AT); Gert Barnstedt, Behamberg (AT); Hans-Juergen Bruene, Stadt Haag (AT)

(73) Assignees: Friedrich Boysen GmbH & Co. KG, Altensteig (DE); Bayerische Motoren Werke Aktiengesellschaft, Munich (DE)

( * ) Notice: Subject to any disclaimer, the term of this patent is extended or adjusted under 35 U.S.C. 154(b) by 1311 days.

(21) Appl. No.: 12/116,428

(22) Filed: May 7, 2008

(65) Prior Publication Data

US 2008/0295497 A1    Dec. 4, 2008

(30) Foreign Application Priority Data

May 8, 2007    (DE) .......................... 10 2007 021 598

(51) Int. Cl.
*F01N 3/00* (2006.01)
*F01N 3/10* (2006.01)
*F01N 1/00* (2006.01)

(52) U.S. Cl.
USPC .................. 60/286; 60/295; 60/301; 60/303; 60/324

(58) Field of Classification Search
USPC ............................. 60/286, 295, 301, 303, 324
See application file for complete search history.

(56) References Cited

U.S. PATENT DOCUMENTS

| | | | | |
|---|---|---|---|---|
| 3,716,344 | A * | 2/1973 | Ashburn | 422/173 |
| 4,004,887 | A | 1/1977 | Stormont | |
| 4,651,524 | A * | 3/1987 | Brighton | 60/274 |
| 5,799,395 | A * | 9/1998 | Nording et al. | 29/890.08 |
| 5,916,134 | A * | 6/1999 | Yang et al. | 60/299 |
| 6,449,947 | B1 | 9/2002 | Liu et al. | |
| 6,536,420 | B1 * | 3/2003 | Cheng | 123/590 |
| 6,601,385 | B2 | 8/2003 | Verdegan et al. | |
| 6,737,032 | B1 | 5/2004 | Aspalter et al. | |

(Continued)

FOREIGN PATENT DOCUMENTS

| | | |
|---|---|---|
| DE | 35 36 315 | 10/1985 |
| DE | 35 36 315 A1 | 4/1987 |

(Continued)

OTHER PUBLICATIONS

Notice of Objection issued in German Application No. DE 08006492.6 dated Sep. 21, 2011 (20 pages) and machine translation of the first page of the Objection (1 page).

*Primary Examiner* — Thomas Denion  
*Assistant Examiner* — Diem Tran  
(74) *Attorney, Agent, or Firm* — Fitch, Even, Tabin & Flannery, LLP

(57) ABSTRACT

A device is provided for the distribution of flowable additives in exhaust gas systems of an internal combustion engine, in particular for the distribution of a water/urea mixture in an exhaust gas system of a diesel engine, having an injection device in particular opening into the exhaust tract before a so-called SRC catalytic converter, with a swirl generation device being provided for the improvement of the mixing of the exhaust gas with the additive in the introduction region of the additive in the exhaust tract.

1 Claim, 4 Drawing Sheets

(56) References Cited

U.S. PATENT DOCUMENTS

| | | | |
|---|---|---|---|
| 6,796,296 B2 * | 9/2004 | Kim .................................. 123/590 |
| 7,448,206 B2 * | 11/2008 | Meingast et al. ................ 60/286 |
| 7,581,387 B2 * | 9/2009 | Bui et al. ......................... 60/286 |
| 8,091,341 B2 * | 1/2012 | Fujino ............................. 60/286 |
| 2002/0162322 A1 | 11/2002 | Ganzmann et al. |
| 2006/0191254 A1 | 8/2006 | Bui et al. |
| 2007/0036694 A1 * | 2/2007 | Nishioka et al. ............... 422/168 |
| 2008/0134671 A1 | 6/2008 | Nefischer |
| 2008/0184700 A1 | 8/2008 | Harrer |
| 2008/0267780 A1 | 10/2008 | Wirth |

FOREIGN PATENT DOCUMENTS

| | | |
|---|---|---|
| DE | 40 38 054 A1 | 6/1992 |
| DE | 42 03 807 A1 | 8/1993 |
| DE | 198 06 265 | 2/1998 |
| DE | 199 34 413 A1 | 1/2001 |
| DE | 100 60 808 A1 | 7/2002 |
| DE | 102 48 294 A1 | 5/2003 |
| DE | 102 48 586 A1 | 5/2003 |
| DE | 102 01 042 A1 | 8/2003 |
| DE | 103 06 134 A1 | 9/2003 |
| DE | 102 39 417 A1 | 3/2004 |
| DE | 10 2006 058 402 A1 | 6/2008 |
| EP | 0 417 383 A2 | 3/1991 |
| EP | 1 022 048 | 11/1999 |
| EP | 0 972 560 A2 | 1/2000 |
| EP | 1 712 751 | 10/2006 |
| EP | 1 712 751 A2 | 10/2006 |
| EP | 1 712 753 A2 | 10/2006 |
| EP | 1 712 756 A1 | 10/2006 |
| EP | 1 770 253 | 4/2007 |
| EP | 1 770 253 | 4/2007 |
| EP | 1 953 359 A1 | 8/2008 |
| EP | 1748162 B1 | 9/2008 |
| EP | 1 985 356 A2 | 10/2008 |
| GB | 2 386 845 A | 10/2003 |
| JP | 2005-083276 * | 3/2005 |
| JP | 2005-083276 A | 3/2005 |
| JP | 2005083276 A | 3/2005 |
| JP | 2006183508 A | 7/2006 |
| WO | 99/39815 A1 | 8/1999 |
| WO | 03/036054 A1 | 5/2003 |
| WO | 2005/073524 | 8/2005 |

* cited by examiner

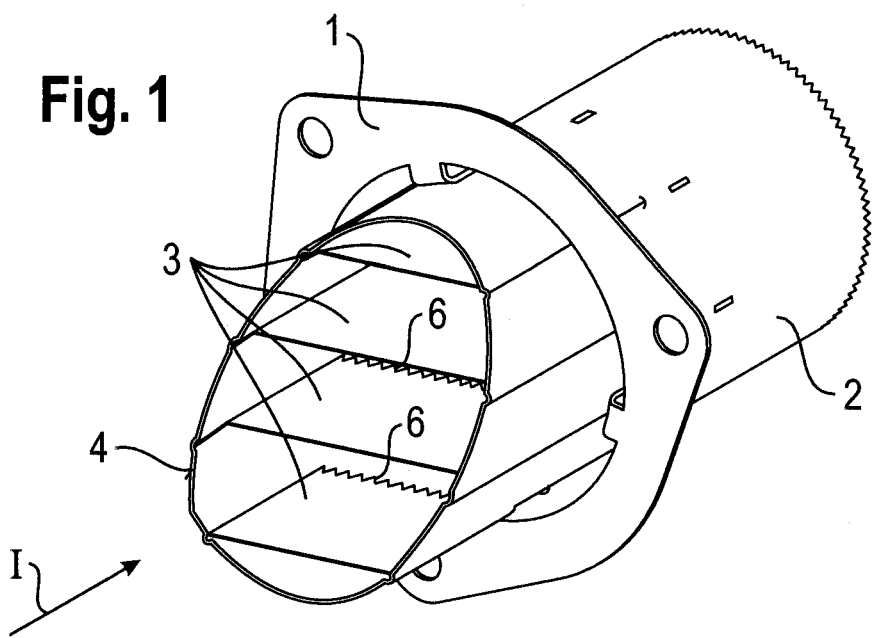
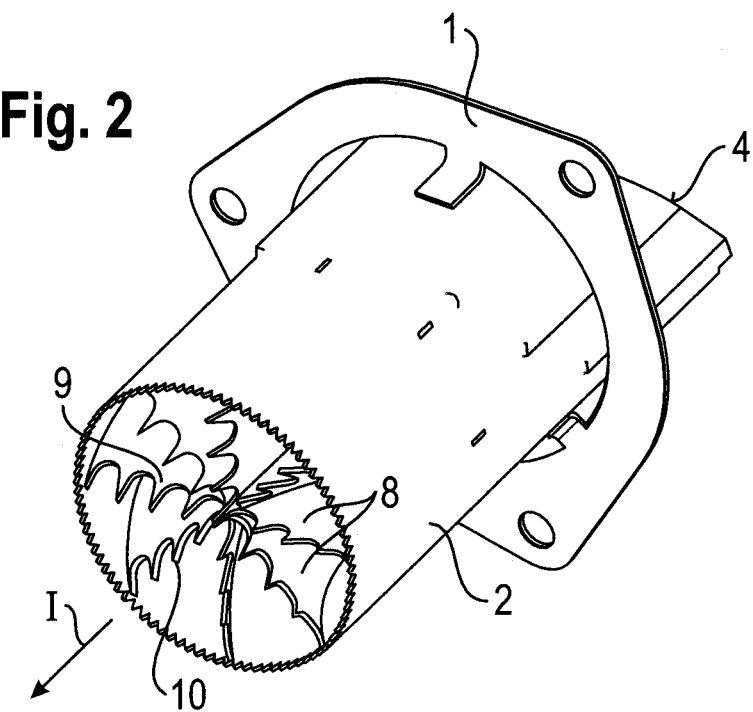

DEVICE FOR THE DISTRIBUTION OF FLOWABLE ADDITIVES IN EXHAUST GAS SYSTEMS

FIELD OF THE INVENTION

The present invention relates to a device for the distribution of flowable additives in exhaust gas systems of an internal combustion engine, in particular for the distribution of a water/urea mixture in an exhaust gas system of a diesel engine, having an injection device in particular opening into the exhaust tract in front of a so-called SCR catalytic converter.

BACKGROUND OF THE INVENTION

Due to the exhaust gas specifications for diesel engines becoming stricter, it is necessary to reduce nitric oxides in the exhaust gas. A known possibility consists of reducing the nitric oxides to nitrogen and water in a so-called selective catalytic reduction. This takes place in a so-called SCR catalytic converter while using a reductant injected into the exhaust gas. A water/urea mixture is in particular used for this purpose whose urea decomposes to form ammonia in the exhaust gas which reacts with the nitric oxides. It is important in this process that the exhaust gas is mixed as uniformly as possible with the reductant and that the additive is evaporated as completely as possible to achieve an efficiency which is as large as possible in the reduction.

SUMMARY OF THE INVENTION

It is the underlying object of the invention to improve the distribution of the additives in the exhaust gas and to increase the evaporation.

This object is satisfied in that a swirl generation device is arranged in the introduction region of the additive in the exhaust tract. This has the advantage that the injected mixture is set into rotation together with the exhaust gas, whereby the mixing of the exhaust gas with the additive is improved. In addition, a liquid phase separation takes place due to inertia effects in the flow deflection in the swirl generator, whereby the not yet evaporated mixture is supplied to the evaporator surfaces. It can thus be prevented that non-evaporated mixture enters into the SCR catalytic converter. The evaporation is therefore further improved.

The swirl generation device can in particular include at least one gas guide vane. This has the advantage, on the one hand, that a good swirl generation can thus be achieved and, on the other hand, that the guide vane itself acts as an evaporator surface. The evaporation power can thereby be further increased overall.

A turbine-like arrangement of a plurality of gas guide vanes is particularly preferred. This effects a particularly good swirl generation and simultaneously makes a large evaporation surface available. The turbine-like embodiment additionally effects a good blocking of the exhaust gas cross-section, with the ratio between the exhaust back pressure and the mixing power being able to be optimized via the length and width of the vanes. The ratio of vane length to vane width preferably amounts to approximately 1.5 to 1 to 2 to 1.

The formation of the gas guide vanes from the wall of an exhaust pipe is particularly advantageous from a technical manufacturing aspect. Material is thereby saved. The weight is additionally reduced and the operating strength is increased. In addition, a gap formation is avoided between the gas guide vanes and an otherwise present outer pipe. The exhaust pipe can have a round cross-section or an angular, in particular a hexagonal, cross-section.

The exhaust pipe forming the turbine is further preferably arranged with a slide seating in a further exhaust pipe and while forming an air gap. The air gap advantageously effects a fast heating of the exhaust pipe and the slide seating has the advantage that the exhaust pipe forming the gas guide vanes can be formed with a low wall thickness since it does not have to take over any supporting function. A fast heating of the exhaust pipe can thus be achieved and the evaporation power can thus be further improved.

In accordance with a further embodiment of the invention, at least one impact plate is provided in front of the opening of the injection device in the exhaust tract. The injected water/urea mixture is scattered in fan shape by the use of impact plates. The mixture is thereby distributed better in the exhaust gas; on the one hand, with respect to the downstream SCR catalytic converter, but also via the following evaporator surface which is, for example, formed by the hot exhaust pipe itself. Due to the better distribution of the injected mixture on the evaporator surface, its thermal capacity is utilized better, the evaporator responds faster. At the same time, the impact plates also act as an evaporator surface, whereby the evaporation power increases.

The distribution of the mixture can still be improved in that the impact plates are arranged at an angle other than 90° to the injection device. The mixture rebounding from the impact plates can thereby be guided in desired directions, for example toward a downstream evaporator surface or the SCR catalytic converter.

The impact plates are particularly preferably arranged parallel to the exhaust gas flow direction. On the one hand, the exhaust gas flow is thereby impeded as little as possible and, on the other hand, a good distribution of the injected mixture can be achieved with an oblique injection into the exhaust gas flow.

In a particularly suitable device, more than one injection nozzle is present for the injection of the additive, for example three or four injection nozzles. It is advantageous in this connection to associate a separate impact plate with each of the injection nozzles, with said impact plates preferably being arranged offset to one another in the exhaust gas flow direction. A particularly good distribution of the injected mixture results from this cascade-like arrangement of impact plates.

In accordance with a further embodiment of the invention, a tubular evaporator device for the additive is provided after the injection point, in particular after the swirl generation device. The evaporation power can be further increased by this additional evaporator device. Any still present liquid portions of the additive can thereby still be evaporated before the SCR catalyst so that they cannot enter into the catalytic converter.

A further advantage results when the tubular evaporator device includes an outer pipe and at least one inner pipe. On the one hand, a larger evaporator surface is thereby made available and, on the other hand, a temperature stratification present in the exhaust gas flow is utilized.

Just before the pipe end of the evaporator device, it can be provided with a slight bulge. This bulge acts as a trap for any liquid portions of the additive possibly still present which thereby do not enter into the following SCR catalytic converter. The liquid portions collected in the bulge are evaporated over time due to the heat of the pipe there.

In accordance with a further embodiment of the invention, which is likewise claimed per se, at least one metal sheet present in the device has a tapered portion at its end downstream from the exhaust gas flow. This tapered portion can consist of a chamfering in accordance with an advantageous embodiment of the invention. It has the advantage that droplets of the additive forming at the end of the metal sheet remain small. The exhaust gas namely flows together at the end of the metal sheet due to the tapered portion and acts on the droplets which thereby release from the metal sheet. Without such a tapered portion, larger droplets which only release from the metal sheet with difficulty could form quasi in the slipstream of the metal sheet.

In accordance with a further advantageous embodiment of the idea, the metal sheet has at least one tip facing in the exhaust gas flow direction at the end. It is also hereby achieved that no larger droplets can form. In this connection, a kind of saw tooth structure at the end of the metal sheet is particularly preferred. In this connection, the spacing between the teeth should be selected to be so large that no drops can cling between the teeth.

Tapered portions of this kind can be provided at all the metal sheets of the device, that is in particular at existing impact metal sheets, at the ends of the gas guide vanes and at exhaust pipes such as the pipe surrounding the gas guide vanes and any existing additional evaporator pipes.

In accordance with a further embodiment of the invention, the surface of at least one metal sheet of the device is made in structured or perforated form. Such a structuring or perforation on the one hand increases the surface of the metal sheet and thus improves the evaporation power. Furthermore, the so-called Leidenfrost effect is thereby suppressed which has the effect that a vapor layer is formed beneath adhering drops which insulates the drops with respect to the metal sheet and thus counteracts an evaporation. Furthermore, droplets present on the metal sheet are mechanically reduced in size, whereby in turn the evaporation is improved. The smaller droplets also adhere better on the metal sheet so that they remain on the metal sheet longer and the evaporation time increases.

For the structuring of the surface, it can be glass bead blasted in accordance with an embodiment of the invention. Furthermore, the surface can be provided with a grating or be made from a structured metal sheet. The desired structuring of the surface is hereby respectively achieved, in particular a microstructure.

In accordance with a further embodiment of the invention, at least one impact plate, the swirl generation device and/or any other metal sheet of the device is made from ferritic stainless steel. The use of ferritic stainless steel has the advantage that its heat conductivity value is higher than, for example, austenitic steel. A lower local cooling of the respective elements and thus in turn a faster heating of the additive thereby advantageously results.

BRIEF DESCRIPTION OF THE DRAWINGS

Embodiments of the invention are shown in the drawings and will be described in the following. There are shown, schematically in each case:

FIG. 1 a perspective view of a device in accordance with the invention looking at the gas inlet opening;

FIG. 2 y perspective view of the device of FIG. 1 looking at the gas outlet side;

DETAILED DESCRIPTION OF THE PREFERRED EMBODIMENTS

Figure 3:
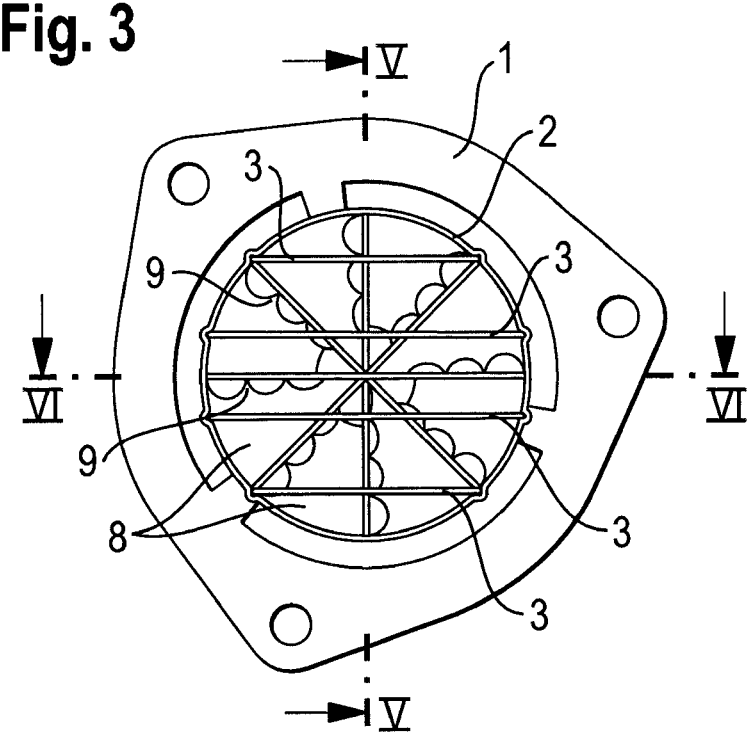
FIG. 3 a plan view of the gas inlet side of the device of FIG. 1.
Figure 4:
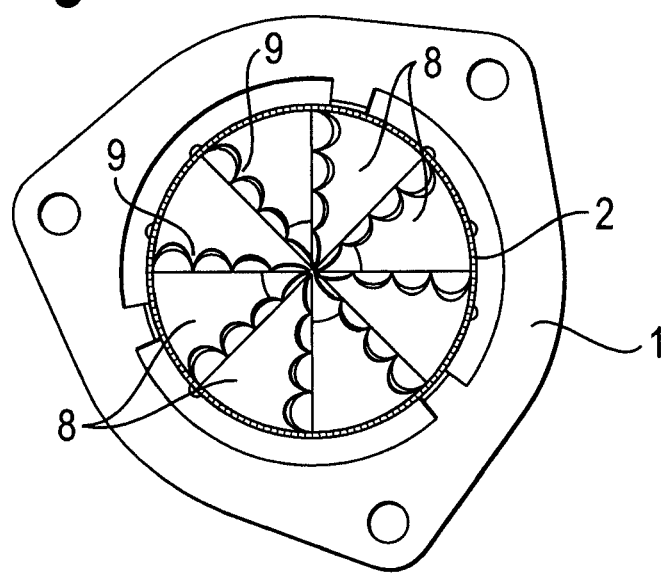
FIG. 4 a plan view of the gas outlet side of the device of FIG. 1.

The device shown in FIGS. 1 to 6 includes an exhaust gas mixing pipe 2 which is provided with a flange 1 and which is made chamfered at the exhaust gas inlet side. Four impact plates 3 are located in the interior of the exhaust gas mixer pipe 2 and are arranged parallel to the exhaust gas flow direction I and over one another with approximately the same spacing. The impact plates 3 terminate substantially flush with the oblique exhaust gas inlet side 4 of the exhaust gas mixer pipe 2 and have approximately the same length among one another. They thereby extend into the exhaust gas mixer pipe 2 by different amounts, as can in particular be recognized in FIG. 5. The topmost impact plate 3 ends approximately in the center of the exhaust gas mixer tube 2.

Figure 6:
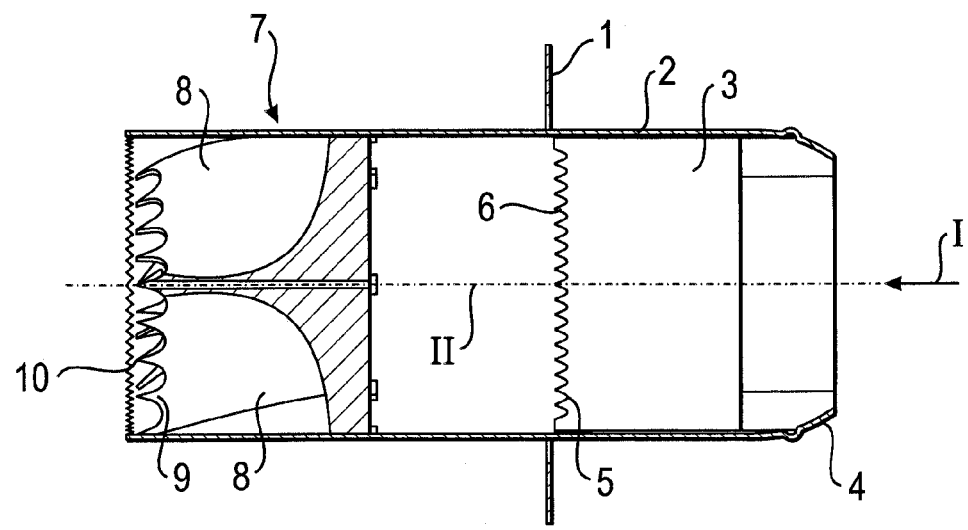
FIG. 6 a section in accordance with the line VI-VI in FIG. 3.

The impact plates 3 are chamfered at their end 5 downstream of the exhaust gas flow, as can in particular be recognized in FIG. 6. The chamfer can be provided up to a thickness of, for example 0.2 mm. The spacing of the teeth 6 preferably amounts to between approximately 4 and approximately 6 mm.

A swirl generation device 7 is provided in the exhaust gas mixer pipe 2 in the exhaust gas direction I after the impact plates 3. Said swirl generation device consists of gas guide vanes 8 arranged and formed in turbine-like manner. This means that the gas guide vanes 8 extend radially outwardly substantially radially from the longitudinal center axis II of the exhaust gas mixer pipe 2, but are bent in themselves so that their contact line with the exhaust gas mixer pipe 2 extends along a spiral line. A strong blocking of the cross-section of the exhaust gas mixer tube 2 thereby results, as can in particular be recognized in FIG. 4. As shown, a total of eight gas guide vanes 8 are provided which are arranged uniformly around the longitudinal center axis II of the exhaust gas mixer pipe 2.

The gas guide vanes 8 of the swirl generation device 7 are provided with pointed jags 9 at their end downstream of the exhaust gas flow. The tips 10 of the jags 9 approximately face in the exhaust gas flow direction I. The jags have a length of up to preferably 10 mm and in turn a spacing from approximately 4 to approximately 6 mm. The ratio of the length of the gas guide vanes 8 to their width preferably amounts to approximately 1.5 to 1 to 2 to 1. The desired large blocking of the cross-section of the mixer pipe 2 thus results with a simultaneously still acceptable back pressure.

Figure 5:
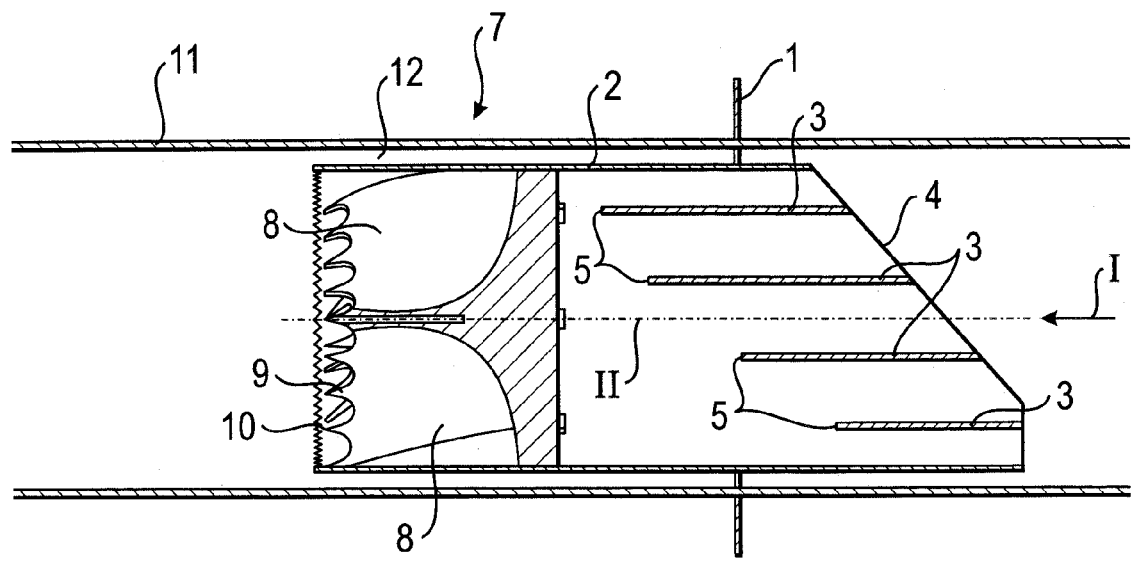
FIG. 5 a section in accordance with the line V-V in FIG. 3.

As shown in FIG. 5, the device shown can be arranged in an outer pipe 11. An air gap 12 is provided between the outer pipe 11 and the exhaust gas mixer pipe 2. The flange 1 is fixedly connected to the outer pipe 11. In contrast, there is a sliding seating between the flange 1 and the exhaust gas mixer 2.

In addition to the exhaust gas mixer pipe 2, an additional evaporator pipe, not shown here, can be arranged in the outer pipe 11 after the exhaust gas mixer pipe 2 which in particular includes an outer pipe and at least one inner pipe. This additional evaporator pipe preferably has a slight bulge at its downstream end.

The surfaces of the components of the device in accordance with the invention, namely in particular the impact plates 3, the gas guide vanes 8 and the additional evaporator pipe, but also the exhaust gas mixer pipe 2, are preferably provided with a structured or perforated surface. The surfaces can, for example, be glass bead blasted, or they can be formed by a grating.

The operation of the device shown is as follows:

The exhaust gas flows in accordance with the arrow I into the outside pipe 11 and flows through the exhaust gas mixer pipe 2. In this connection, the exhaust gas mixer pipe 2, the impact plates 3 and the gas guide vanes 8 are heated by the exhaust gas. The exhaust gas exiting the exhaust gas mixer pipe 2 subsequently enters into an SCR catalytic converter. For the generation of a reduction of nitric oxides in the SCR catalytic converter, a water/urea mixture is injected into the outer pipe 11 at an angle to the exhaust gas flow direction I before the exhaust gas mixer pipe 2. In the embodiment shown, the injection device, not shown, has four injection nozzles which are each associated with an impact plate 3. This means that each of the four jets impacts one of the impact plates 3, is thrown back by it and is fanned out. A good distribution of the injected mixture in the exhaust gas flow thereby results. The mixture impacting on the impact plates 3 is in addition heated by the hot impact plates 3 so that an evaporation of the mixture already starts. The mixture then moves with the exhaust gas into the swirl generation device 7 where the exhaust gas with the mixture is set into a rotation around the longitudinal center axis II of the exhaust gas mixer pipe 2. A good mixing of the exhaust gas with the water/urea mixture thereby takes place. In addition, the gas guide vanes 8 of the swirl generation device 7 also act as an evaporator surface.

After exiting the exhaust gas mixer pipe 2, the exhaust gas optionally moves into a further evaporator pipe which can include an outer pipe and one or more inner pipes. Any liquid portions of the mixture possibly still present can be evaporated here so that then only gaseous reductant moves into the SCR catalytic converter. The reduction of nitric oxides to nitrogen and water takes place in this.

The atomization and distribution of the mixture is further improved by the structured or perforated surfaces of the elements of the device in accordance with the invention. In addition, droplets of the mixture are comminuted and they are held longer on the evaporator surfaces. On the other hand, the droplets of the mixture release more easily from the ends of the impact plates 3 through the teeth 6 and from the gas guide vanes 8 through the teeth 9. The arising of large droplets which can then only be evaporated with difficulty is prevented. Due to the slide seating of the exhaust gas mixer pipe 2 in the outer pipe 11, the former can moreover be made with a comparatively low wall thickness so that the exhaust gas mixer 2 is heated fast by the exhaust gas. The effectiveness of the evaporation device is thereby present fast.

Figure 7:
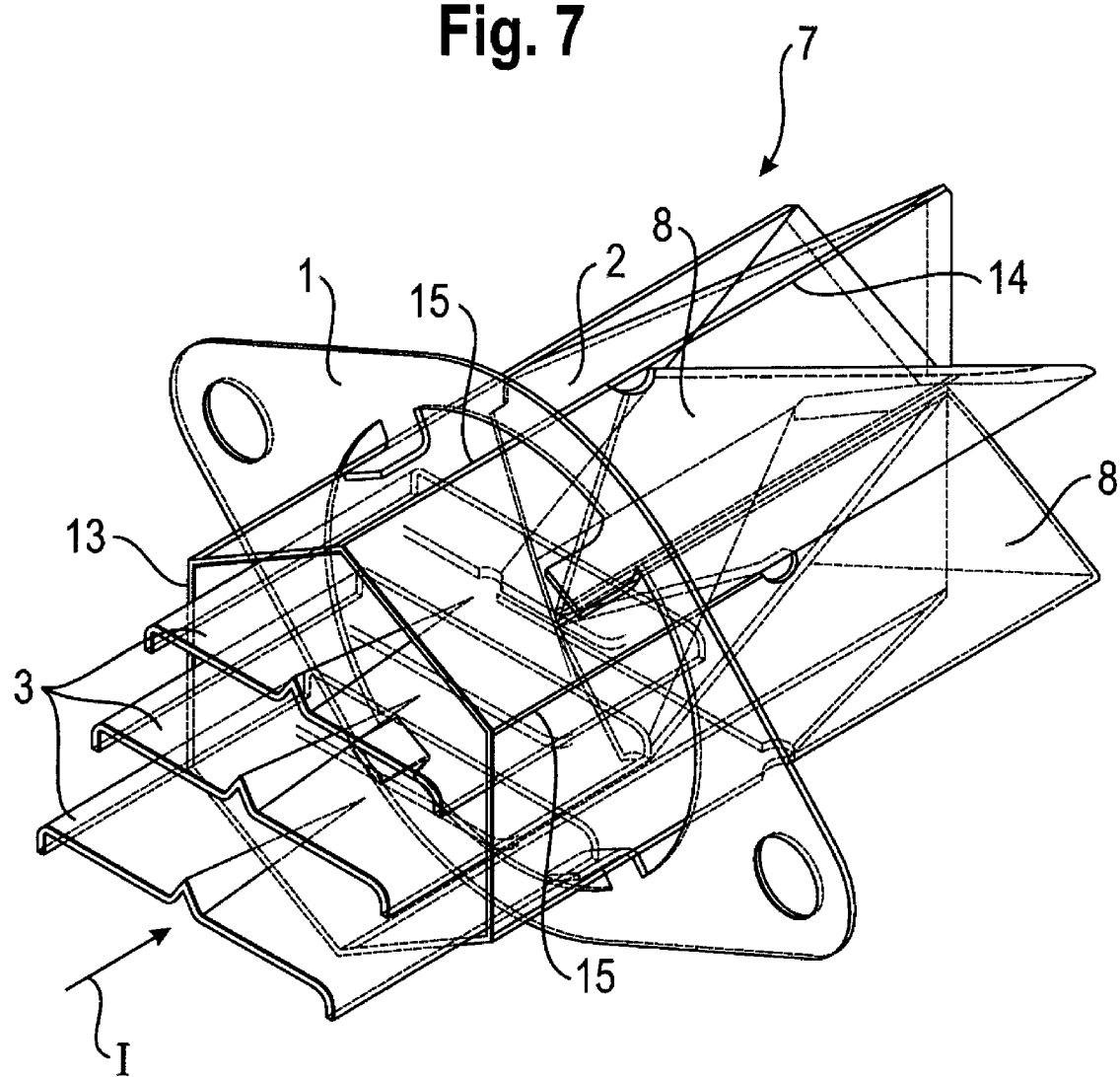
FIG. 7 a perspective view of a variant of the device in accordance with the invention.

Finally, FIG. 7 shows a variant of the device in accordance with the invention in which the swirl generation device 7 is formed by the exhaust gas mixer pipe itself 2. For this purpose, the pipe wall 13 of the exhaust gas mixer pipe 2 is provided with incisions 14 which are guided from the side downstream of the exhaust gas into the exhaust gas mixer pipe 2. In the region of these sections 14, the pipe wall 13 is in each case bent over inwardly so that guide vanes 8 arranged in turbine-like manner result. The exhaust mixer pipe 2 is here made as hexagonal in cross-section and the incisions 14 are each guided along an edge 15 of the exhaust gas mixer pipe 2. A comparatively simple manufacturability of the exhaust gas mixer pipe thereby results with six gas guide vanes 8 formed. The swirl generation device 7 is made in one piece with the exhaust gas mixer pipe 2 by this type of manufacture so that no gap is formed. The operation is as in the variant of FIGS. 1 to 6.

What is claimed is:

1. A device for the distribution of flowable additives in exhaust gas systems of an internal combustion engine, for the distribution of a water/urea mixture in an exhaust gas system of a diesel engine, having an injection device opening into an exhaust tract before a SCR catalytic converter, wherein a swirl generation device is arranged in an introduction region of the additive in the exhaust tract, a tubular evaporator device for the additive is provided after the injection point and the swirl generation device, and a slight bulge is provided just before a pipe end of the evaporator device.

* * * * *